(12) United States Patent
Sugaya

(10) Patent No.: US 6,493,545 B1
(45) Date of Patent: Dec. 10, 2002

(54) COMMUNICATION CONTROL METHOD AND TRANSMISSION APPARATUS

(75) Inventor: Shigeru Sugaya, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/397,843

(22) Filed: Sep. 17, 1999

(30) Foreign Application Priority Data

Sep. 18, 1998 (JP) .......................................... 10-265054

(51) Int. Cl.[7] ................................................ H04B 7/00
(52) U.S. Cl. ........................ 455/272; 455/269; 455/277; 455/278; 370/346; 375/347; 342/374
(58) Field of Search ................................ 455/272, 269, 455/278, 277; 370/346; 342/374; 375/347

(56) References Cited

U.S. PATENT DOCUMENTS

| | | | | |
|---|---|---|---|---|
| 5,095,535 A | * | 3/1992 | Freeburg ................. | 455/277.1 |
| 5,475,681 A | * | 12/1995 | White et al. ................. | 370/346 |
| 5,767,807 A | * | 6/1998 | Pritchett ..................... | 342/374 |
| 6,141,392 A | * | 10/2000 | Hoshikuki et al. .......... | 375/347 |

\* cited by examiner

Primary Examiner—Daniel Hunter
Assistant Examiner—Alan T. Gantt
(74) Attorney, Agent, or Firm—Jay H. Maioli

(57) ABSTRACT

At least one communication station is provided with a number of antennas having directivities, a communication station to which a radio signal is transmitted for the next communication is judged by the communication station provided with the number of antennas, an optimal antenna communicating with the communication station is judged based on a receiving state when a signal from the judged communication station was received in the past; and wireless communication is performed by using the judged antenna, so that when a network system is wirelessly composed of several stations, a quality of communication can be optimized.

4 Claims, 9 Drawing Sheets

COMMUNICATION CONTROL METHOD AND TRANSMISSION APPARATUS

BACKGROUND OF THE INVENTION

1. Field of the Invention

The present invention relates to a communication control method preferably applied when various information is transmitted by means of a wireless signal, for example, to construct a local area network (LAN) among a plurality of devices, and a transmission apparatus using this control method.

2. Description of the Related Art

Conventionally, in a relatively small range such as home, office or the like, when a local area network is. constructed among a plurality of apparatus such as various video apparatuses, a personal computer machine, its periphery and so on so as to transmit data handled by these apparatus, a wireless signal transmitter/receiver (a wireless transmission apparatus) is connected to each apparatus so as to enable data transmission through wireless transmission, instead of direct connection among apparatus via some signal lines.

A local area network is constructed through wireless transmission, thereby making it possible to simplify a system configuration without requiring direct connection among apparatus via a signal line or the like.

In the meantime, when a network is configured wirelessly, wireless transmission among devices in the network is required to be performed reliably without an occurrence of an error. When the network is composed of only two transmission apparatuses (radio stations), and these stations are fixedly positioned, it may be sufficient that transmission/receiving antennas or the like that the respective stations comprises are installed. If a number of radio stations exist in the network, there exist a plurality of counterparts performing wireless communication in the respective stations, occasionally making it difficult to communicate with all stations in simple settings.

To solve this problem, for example, each radio station is structured of performing diversity reception provided with a plurality of antennas with directivity. When wireless communication is performed, it may be considered that processing for selecting the best receivable antenna is performed. When the above mentioned local area network is constructed wirelessly, communications protocols required to ensure connection among stations in the network are complicated. In addition, it is required to perform cumbersome control in order to always check the presence or absence of wireless connection. Thus, wireless transmission traffic on use other than essential information transmission is likely to increase, and a plurality of electric wave arrival directions are produced for a short period of time. This problem cannot be solved by conventional diversity reception processing for simply selecting a proper receiving system.

That is, in general diversity reception, processing for supervising a signal reception state for a certain period of time and judging a system whose reception state is the best is required to judge a good receiving directional antenna. It is difficult to apply such time-consuming processing to the above mentioned wireless local area network.

SUMMARY OF THE INVENTION

It is an object of the present invention to ensure that a communication state among stations is always proper when a network system is wirelessly composed of a plurality of stations.

In a communication control method according to the present invention, at least one communication station is provided with a plurality of antennas with directivity, a communication station to which a radio signal is transmitted next time is judged by the communication station provided with a plurality of antennas, an optimal antenna performing communication with that communication station is judged based on a state when a signal from the judged communication station has been received in the past, and wireless communication is performed using the judged antenna.

According to this communication control method, communication processing is performed by switching to an optimal antenna of a plurality of provided directional antennas in a linked relation to a change of a communication station performing communication.

A transmission apparatus according to the present invention is provided with: a plurality of antennas to be selectively connected to transmission processing means for performing wireless communication with another communication station in a network; a storing means for storing information of an optimal antenna for each communication station in the network; and a control means for selecting an optimal antenna from the stored information of the storing means based on judgment of a communication station performing wireless transmission next time.

According to this transmission apparatus, selection of a plurality of antennas having directivity is properly controlled based on judgment of the communication station performing communication next time and the stored information of the storing means, an optimal directional antenna is always selected, and wireless communication is performed.

DETAILED DESCRIPTION OF THE PREFERRED EMBODIMENTS

Hereinafter, an embodiment of the present invention will be described with reference to FIG. 1 to FIG. 8.

In this example, the present invention is applied to a network system configured as a system for transmitting and receiving video data, voice data computer data or the like at home or in a relatively small office or the like. A system configuration of this example will be described with reference to FIG. 1. In this example, a network is composed of eight wireless transmission apparatuses 1 to 7 and 10.

Antenna devices 1a to 7a and 10a are respectively connected to the wireless transmission apparatuses 1 to 7 and 10 for performing signal transmission and signal reception. The antenna devices 1a to 7a and 10a that the wireless transmission apparatuses 1 to 7 and 10 of this example comprise are constructed as antenna devices combined with a plurality of directional antennas. These antenna devices will be described later in detail. A variety of processing devices (not shown) such as a video signal reproducing device, a monitor device, a computer machine, a printer device and so on are individually connected to the wireless transmission apparatuses 1 to 7 and 10. When data transmission among these processing devices is required, the data is transmitted via the connected wireless transmission apparatuses.

The eight wireless transmission apparatuses 1 to 7 and 10 each function as a node that is a communication station, and each apparatus is assigned with an identification number ID individually in advance. That is, the transmission apparatus 10 is assigned with #0 as its identification number ID, and the transmission apparatuses 1 to 7 are assigned with identification numbers ID from #1 to #7 in order.

In this case, a system configuration is such that arbitrary one wireless transmission apparatus in the network system is set as a route node that functions as a central control station, and wireless communication among nodes is executed by means of polling control from the control station. Basically, it is ideal that this control station uses a wireless transmission apparatus allocated at a position capable of directly making wireless communication with all other communication stations in the system. Here, the wireless transmission apparatus 10 whose identification number ID is #0, allocated at a substantial center in the network system is defined as a central control station. A so-called start-type connection configuration is employed in which other peripheral communication stations are controlled from this central route node. In the following description, "communication stations", which is merely referred to as, is inclusive of the central control station.

Figure 1:
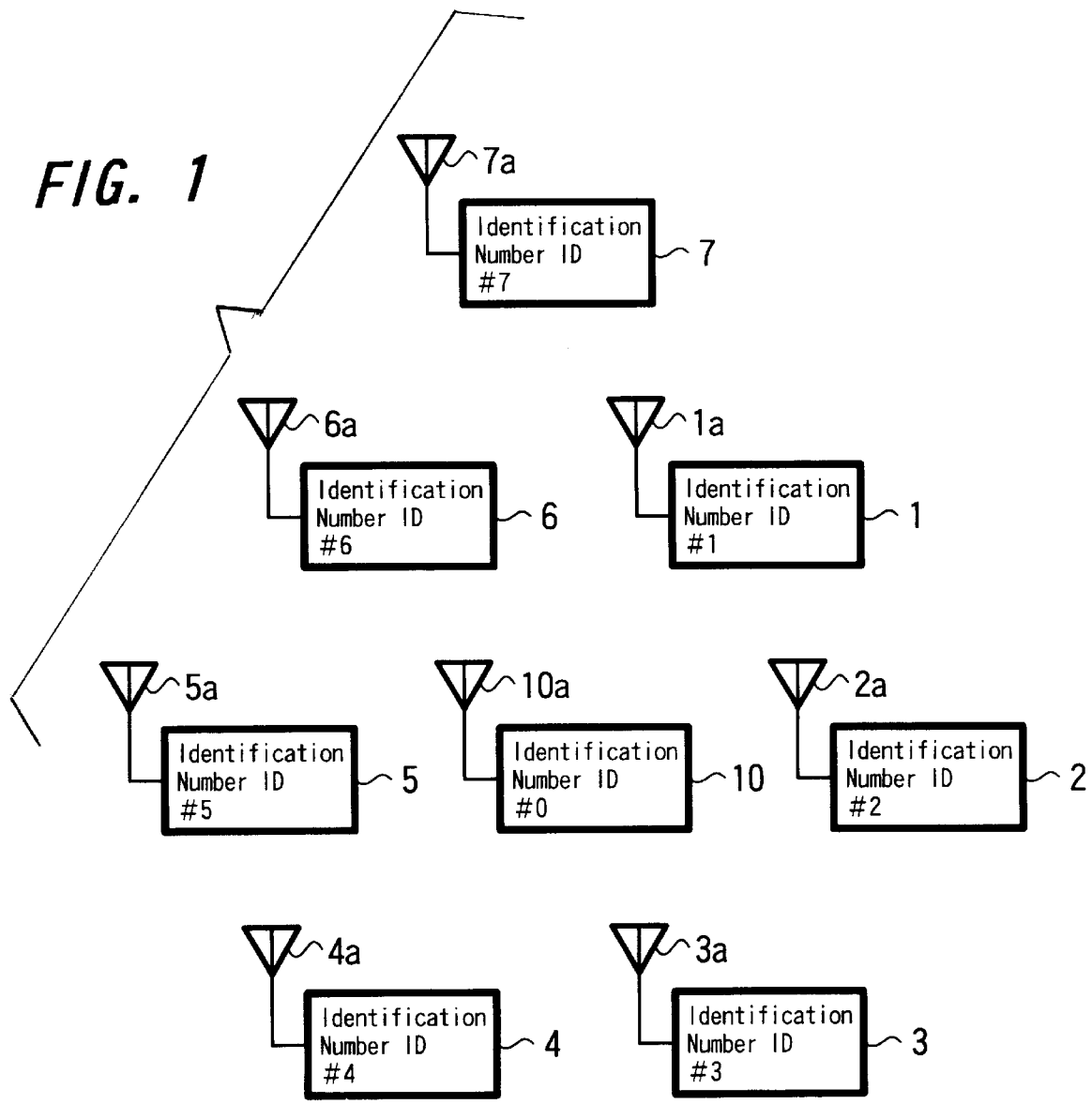
FIG. 1 is a structural view showing an example of a communication system according to one embodiment of the present invention.
Figure 2:
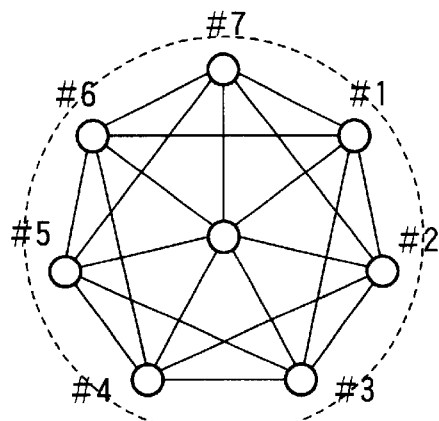
FIG. 2 is an explanatory view showing an example of a physical topology map according to one embodiment of the present invention.

FIG. 2 is a view showing a physical topology map that shows a communication state among stations in a state of respective communication stations and the control station in this example, wherein direct communication is enabled among communication stations indicated by the solid lines. In this example, basically, the communication stations 1 to 7 each is incapable of directly making communication with the most distant communication station in the network. Specifically, for example, the communication station 1 whose identification number ID is #1 is capable of directly making wireless communication with the communication stations whose identification numbers IDs are #0, #2, #3, #6, and #7, but is incapable of directly making communication with the communication stations whose identification numbers IDs are #4 and #5 allocated at the most distant position from the communication station 1. The communication station (control station) 10 whose identification number ID is #0 allocated at the substantially center is capable of directly making communication with all the communication stations 1 to 7. When communication is performed among communication stations incapable of directly making communication, the other communication station performs transmission processing by relaying transmission data.

Figure 3:
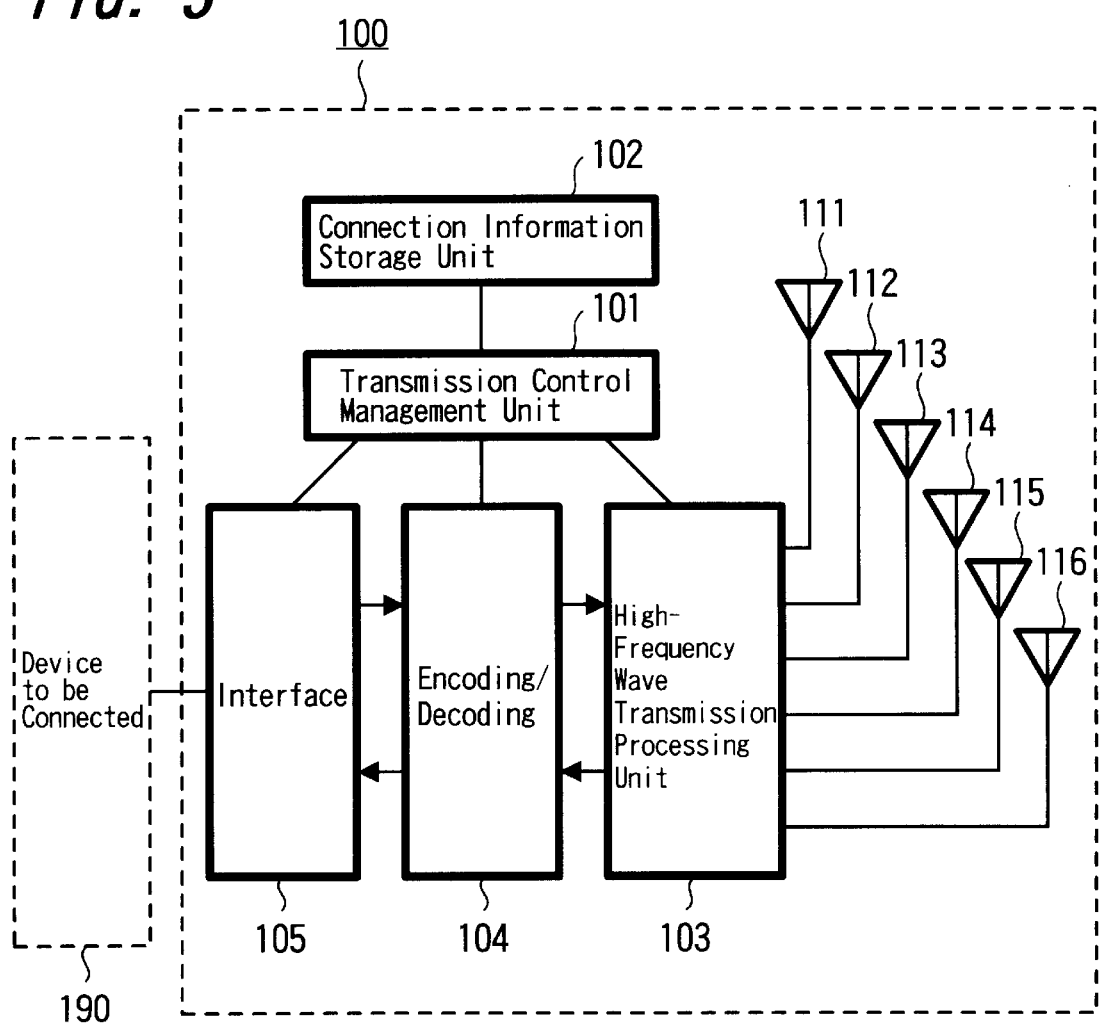
FIG. 3 is a block diagram showing an example of a configuration of a transmission apparatus according to one embodiment of the present invention.

FIG. 3 shows a configuration example of the wireless transmission apparatuses 1 to 7 and 10 each constituting the communication stations. In this figure, basically, each of the wireless transmission apparatus 1 to 7 and 10 is commonly configured (only a control arrangement serving as a central control station differs from the other communication stations). A wireless transmission apparatus 100 used as each of the wireless transmission apparatuses 1 to 7 and 10 is provided with: a transmission control management unit 101 that is a controller performing communication control; and a connection information storing unit 102 that is a memory connected to this transmission control management unit 101. The connection information storing unit 102 stores communication control programs, network connection states, information on antennas optimal for communication with any other station.

Figure 4:
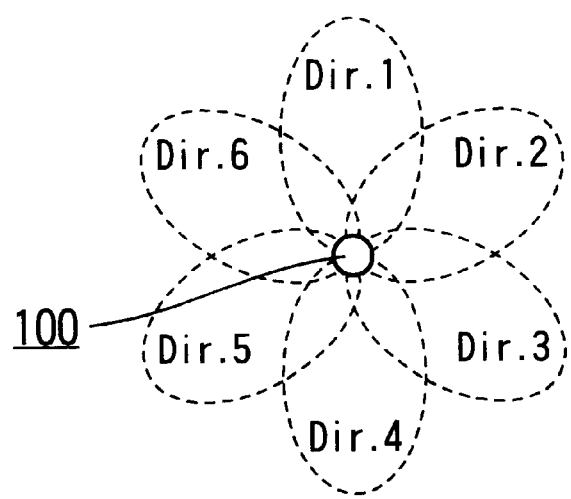
FIG. 4 is an explanatory view showing an example of directivities of antennas installed in the transmission apparatus according to one embodiment of the present invention.

Antenna devices that the wireless transmission apparatus 100 comprises are composed of six directional antennas 111, 112, 113, 114, 115, and 116, and the directivities of these six antennas 111 to 116 are set to other directions, respectively. That is, when the directivity ranges of the six antennas 111 to 116 are set to, for example, Dir. 1 to Dir. 6, as shown in FIG. 4, for example, the directivity ranges Dir. 1 to Dir. 6 are shifted by 60°, respectively, and are set so that directivities are present in all directions around the wireless transmission apparatus 100.

The six directional antennas 111 to 116 serve as antennas performing both of signal transmission and signal reception, and are connected to a high-frequency wave transmission processing unit 103. The high-frequency wave transmission processing unit 103 performs a predetermined transmission processing for transmission data to be supplied, forms the data as a transmission signal performing wireless transmission, supplies the transmission signal to at least one of the six antennas 111 to 116, and wirelessly transmits the signal at a predetermined frequency. In addition, a signal at a predetermined frequency received by using one of the six directional antennas 111 to 116 is subjected to reception processing at the high-frequency wave transmission processing unit 103 to produce an intermediate-frequency signal. Switching of the antennas 111 to 116 to be connected to the high-frequency wave transmission processing unit 103 is executed under the control of a transmission control unit 101.

As a transmission system in which transmission and reception of signal are performed at the high-frequency wave transmission processing unit 103 of this example, for example, a transmission system using a multi-carrier signal, so-called OFDM (Orthogonal Frequency Division Multiple) system is applied. As a frequency used for transmission and reception of signal, for example, a very high frequency band (for example, 5 GHz band) is used. In the case of this example, a relatively weak transmission output is set. For example, for indoor use, the output is set to an extent such that wireless transmission in a relatively short distance from several meters to several tens of meters can be performed.

An encoding/decoding unit 104 for encoding a signal to be transmitted by the high-frequency wave processing unit 103 and a decoding a signal received by the high-frequency wave processing unit 103 is provided. Reception data decoded by the encoding/decoding unit 104 is supplied to a device 190 connected to this transmission apparatus 100 via an interface unit 105, and data supplied from the device 190 is supplied to the encoding/decoding unit 104 via the interface unit 105. The interface unit 105 is a circuit performing interface processing with the device 190 connected thereto. For example, data is transferred among the transmission apparatus 100 and the device 190 in a system conforming with the IEEE1394 Interface System.

The transmission and reception processing at the high-frequency wave transmission processing unit 103, encoding and decoding processings at the encoding/decoding unit 104, and interface processing at the interface 105 are executed under the control of the transmission control management unit 101.

In the case where the reception data received by the high-frequency wave transmission processing unit 103 and decoded by the encoding/decoding unit 104 is control data to be transmitted from other station such as a central control station or the like, the control data is supplied to the transmission control management unit 101, and the transmission control management unit 101 judges the contents of the control data. In addition, in the case where the transmission control management unit 101 transmits control data to the other station such as the central control station and the like, the control data is supplied to the encoding/decoding unit 104, and is processed by the high-frequency wave transmission processing unit 103 for transmission. The control data for performing transmission with other stations includes a frame synchronizing signal to be transmitted from the central control station; polling information for performing transmission control for each station; and a response signal from each communication station in response to the polling information.

Figure 5:
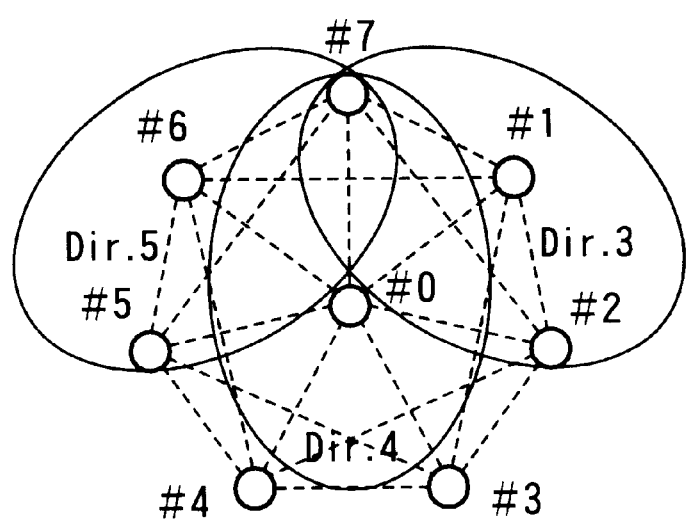
FIG. 5 is an explanatory view showing an example of receivable areas for directional antennas according to one embodiment of the present invention.

Thus, the wireless transmission apparatus 100 configured in this way is allocated as each of the wireless transmission apparatuses 1 to 7 and 10 shown in FIG. 2 to configure a wireless network system. Each of the wireless transmission apparatuses 1 to 7 and 10 is provided with the six directional antennas 111 to 116, as described above, and the receivable or service area is changed at each of the directional antennas. For example, as shown in FIG. 5, in the wireless transmission apparatus 7 whose identification number ID is #7, the transmission apparatuses 1 and 2 whose identification numbers IDs are #1 and #2 exist in the directivity range Dir. 3 received by an antenna 113; the transmission apparatus 10 whose identification number ID is #0 exists in the directivity range Dir. 4 received by the antenna 114; and the transmission apparatus 5 and 6 whose identification numbers IDs are #5 and #6 exist in the directivity range Dir. 5 received by the antenna 115. As seen from the wireless transmission apparatus 7, the transmission apparatuses 3 and 4 whose identification numbers IDs are #3 and #4 are positioned outside the range received by any of the antennas 111 to 116 (i.e., wireless transmission cannot be performed directly among the transmission apparatuses 3 and 4). In addition, the other three directional antennas 111, 112, and 116 that the wireless transmission apparatus 7 comprises are not used for communication in this network.

The range received by the six antennas that the other wireless transmission apparatuses 1 to 6 and 10 comprise is set in a manner similar to the above.

Now, a state in which wireless transmission is performed in a network system of this example will be described. In this example, wireless transmission from each communication station is performed by polling control from a central control station (transmission apparatus 10 whose identification number ID is #0) allocated at the substantial center in the network. That is, when the central control station transmits polling information for calling each station in the network in order, and the other communication station receives polling information of which the identification number ID of its own station is assigned, in the case where data to be transmitted from that station is present, a response signal is returned to the central control station. Then data is transmitted to an arbitrary counterpart as a response to the polling.

When the polling information of which the identification number ID of its own station is assigned is received, in the case where there exists no data to be transmitted by that station, a response signal is not transmitted. In the central control station, when it is confirmed that a response signal is not transmitted after an elapse of time after polling information has been received, the polling information is transmitted after the identification ID of the next communication station has been assigned. In addition, in the case where a response signal is transmitted, after a unit of data transmission from that station is completed, the identification number ID of the next communication station is assigned, and then, polling information is transmitted. Therefore, a timing at which wireless transmission from each communication station is performed is controlled by the central control station. A time from reception of polling information by each station to transmission of a response signal is set to a predetermined time. In addition, the central control station transmits a frame synchronizing signal or the like together with these polling control signals. A frame period is specified by this frame synchronizing signal. For example, an interval for transmitting management information and an interval for performing data transmission are set in that frame period. In the management information transmission interval, management information such as identification number data specific to a network system, data on topology map in the network or the like is transmitted; and in an interval provided for data transmission, polling transmission processing is executed.

In addition, in the connection information storage unit 102 of the wireless transmission apparatus constituting each communication station including a central control station, when any antenna is used for communication with another communication station in the network during a predetermined processing, antenna information concerning whether or not data can be received successfully is stored. The antenna information is stored based on a reception state when the setup state of each communication station in the network is recognized after any initial setting operation has been performed. At this time, the setup state is recognized by the central control station so that other communication stations may judge the state based on control information to be transmitted from this central control station. In addition, even if such an initial setting operation has not been performed by performing wireless communication in the network, an antenna capable of proper communication with each communication station at any time from the reception state is judged. And the judged antenna information may be stored in the connection information storage unit 102.

In any case, when an antenna capable of proper communication is changed to another antenna in order to take action for a change in communication state due to the position movement of each communication station in the network, the antenna information stored in the connection information storage unit 102 may be updated.

Thus, with the antenna information being stored in the connection information storage unit 102, when each communication station other than central control station waits for polling transmission, an antenna having a directivity range in which a signal from the central control station can be received is selected as a reception antenna. That is, in the communication station whose identification number ID is #7, for example, (refer to FIG. 5), an antenna whose directivity range is Dir. 4 is selected as a reception antenna. After polling information from the central control station has been received while that antenna is selected, the transmission control management unit 101 of each station performs control for switching a receiving antenna based on the received information. In addition, while a reception antenna is selected so as to receive a signal from an station other than central control station, even if the signal cannot be received at an occurrence of any trouble, processing returns to a state in which an antenna having a directivity range capable of receiving a signal from the central control station is selected as a reception antenna.

Figure 6:
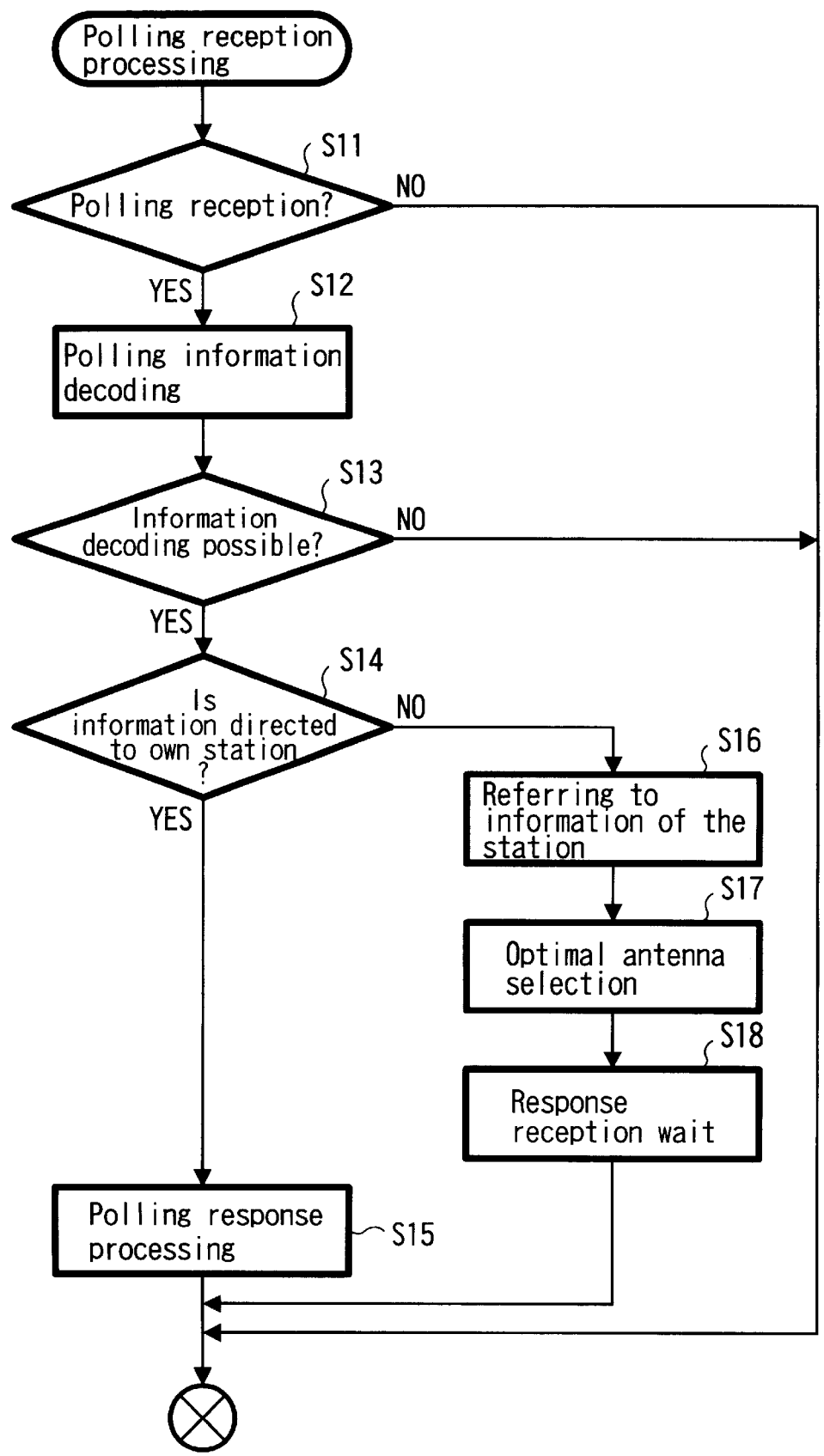
FIG. 6 is a flow chart showing a polling reception sequence according to one embodiment of the present invention.
Figure 7:
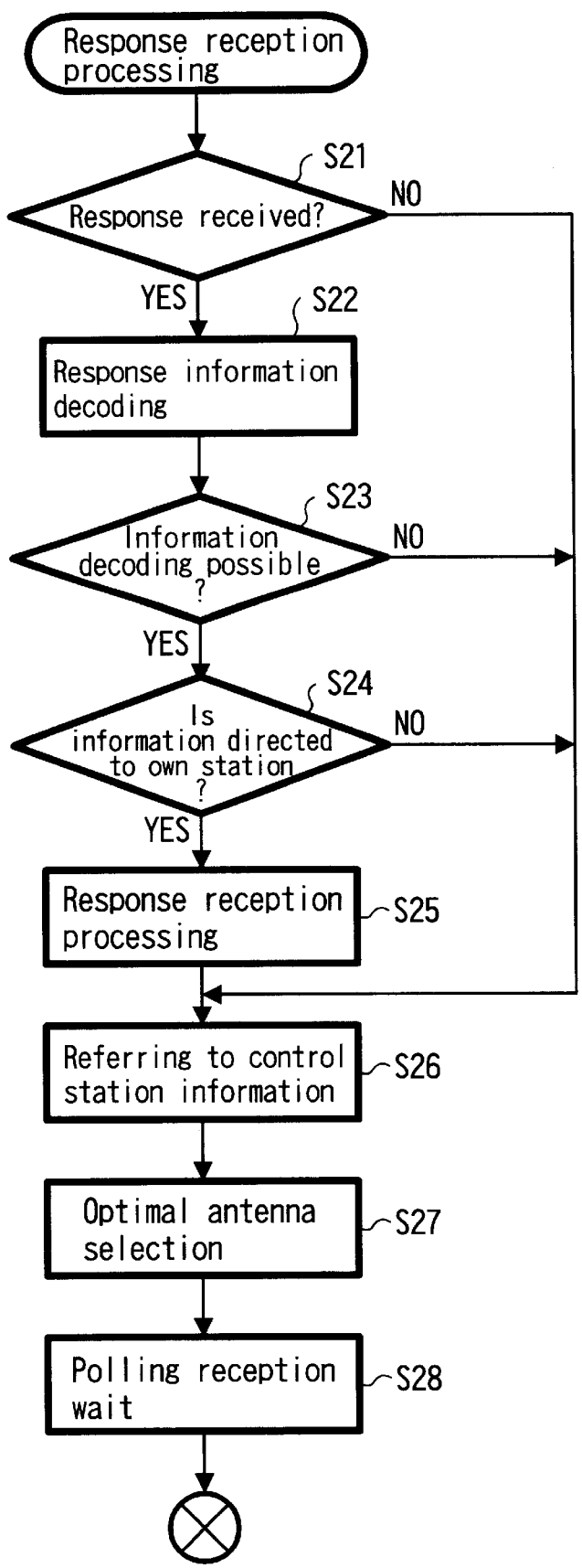
FIG. 7 is a flow chart showing a response reception sequence according to one embodiment of the present invention.

Now, processing for each communication station in the network system of this example to perform communication by polling control, and associated antenna selection processing will be described with reference to flow charts in FIG. 6 and FIG. 7. First, processing for each communication station to receive polling information from the central control station will be described with reference to the flow chart in FIG. 6. The polling information reception processing is executed under the control of the transmission control management unit 101. The transmission control management unit 101 judges whether or not polling information is contained in the received signal (step S11). When polling information is detected from the received signal, the polling information is subjected to a decoding process (step S12), and it is judged whether or not decoding is successful (step S13). When decoding is successful, it is judged whether or not the polling information is directed to its own station (step S14).

When it is judged to be polling information to its own station, processing for response to that polling is performed (step S15). As processing for response to the polling, for example, when there exists data to be transmitted, a response signal is transmitted to the central control station, and then, a target data is transmitted in requence to that response signal.

In step S14, when it is judged not to be polling information to its own station (i.e., when it is judged to be polling information to other station), the transmission control management unit 101 reads from the connection information storage unit 102 the antenna information optimal to receive a signal from that station specified based on the polling information (step S16), and selects an optimal antenna based on the stored information (step S17). The transmission control management unit 101 waits for reception of data to be transmitted as a response to the polling with the selected antenna being a reception antenna (step S18).

If there exists no optimal antenna information in step S16 (if the information is not stored in the connection information storage unit 102) or if data from the corresponding station cannot be received in step S18, processing for receiving the next polling information may be performed again.

Now, processing when response reception processing is ready in step S18 will be described with reference to a flow chart of FIG. 7. The transmission control management unit 101 of the transmission apparatus judges whether or not there exists reception of a response to the polling from the central control station (step S21). When the response is received, the decoding process of the received information is executed by the encoding/decoding unit 104 (step S22). Then, it is judged whether or not the decoding is possible (step S23); and when decoding is done, it is judged whether or not the information is directed to its own station (step S24). When it is judged that the information is directed to its own station, the response reception processing is executed under the control of the transmission control management unit 101 (step S25).

When the response reception processing at this time is completed, the transmission control management unit 101 reads from the connection information storage unit 102 the antenna information optimal to receive a signal from the central control station (step S26); selects an optimal antenna based on the stored information (step S27), waits the selected antenna as a reception antenna, and shifts to a reception state of polling information (step S28). In step S21, when it is judged that no response is received, when the received information in step S23 cannot be decoded, and when the decoded information in step S24 is not directed to its own station, processing goes to step S26, and the reception processing of polling information is ready.

Thus, each communication station performs polling reception processing and response reception processing and performs reception processing while the optimal antenna for each processing is selected. In the case of the central control station, polling reception processing is polling transmission processing.

Figure 8:
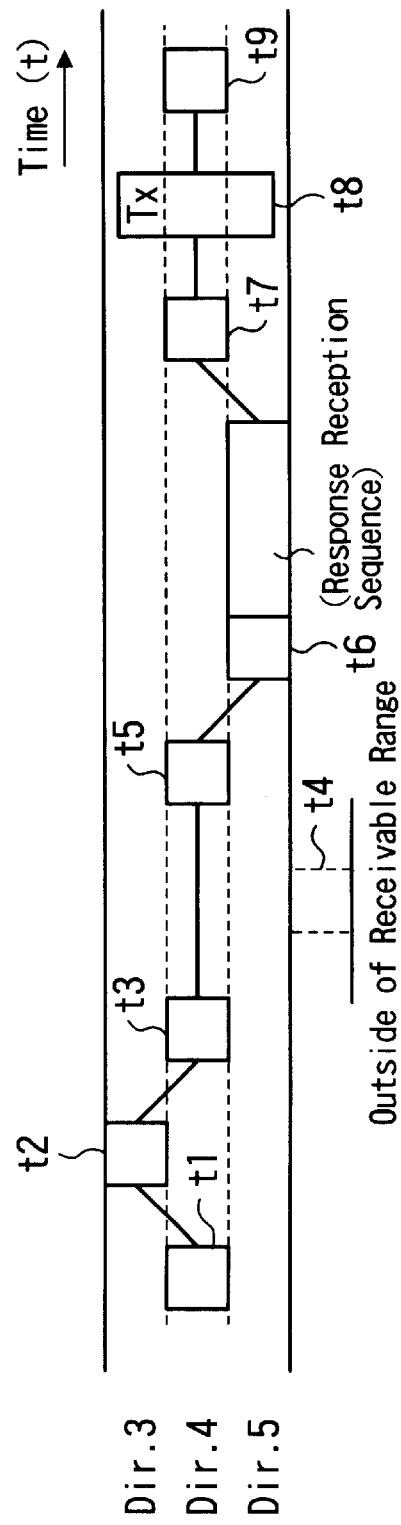
FIG. 8 is a timing chart showing an example of antenna switching process according to one embodiment of the present invention.

An example of antenna switching operation is shown in a timing chart of FIG. 8. In the figure, the state in the communication station 7 whose identification number ID is #7 is shown. In this communication station, as shown in FIG. 5, three antennas 113, 114, and 115 whose receivable ranges are Dir. 3, Dir. 4, and Dir. 5 are selectively used.

At a first timing t1 shown in FIG. 8, an antenna having the receivable range Dir. 4 capable of receiving a signal from the central control station 10 whose identification number ID is #0 is selected, and polling information from the central control station is received. The received polling information at the timing t1 is decoded, and a station as a polling destination is judged. Assuming that the communication station 1 whose identification number ID is #1 has been specified, switched is an antenna having the receivable range Dir. 3 based on antenna information provided at the storage unit in the communication station 7, and the antenna waits until response information from the communication station 1 whose identification number ID is #1 has been received at a timing t2.

After the response information has been received at the timing t2 (or where no response information has been received), an antenna having the receivable range Dir. 4 capable of receiving a signal from the central control station 10 whose identification number ID is #0 is selected, and the antenna waits for reception of polling information from the central control station. When the polling information is received at a timing t3, the received polling information is decoded, and a station as a polling destination is judged. At this time, assuming that the communication station 3 whose identification number ID is #3 has been specified, the transmission control management unit 101 in the communication station 7 judges that communication with the communication station 3 is disabled based on the stored information in the storage unit 102, and waits for reception while the antenna whose receivable range is Dir. 4 capable of receiving a signal from the central control station 10 is selected.

After a timing t4 at which response information from the communication station 3 outside the reception area has been elapsed, the next polling information is received at a timing t5. A station as a polling destination is judged based on the received polling information. Assuming that the communication station 5 whose identification number ID is #5 has been specified, switched is an antenna whose receivable range is Dir. 5 based on antenna information provided at the storage unit in the communication station 7, and the antenna waits until response information from the communication station 5 whose identification number ID is #5 has been received at a timing t6. At this time, if data is transmitted to its own station 7, the data is received.

When the data reception has been completed, processing returns to selection of an antenna whose receivable range is Dir. 4 capable of receiving a signal from the central control station 10. When polling information is received at a timing t7, a station specified based on the received polling information is judged. In this case, it own station 7 is specified, and if there exists data to be transmitted from its own station, the own station performs data transmission Tx at the next timing t8. During the transmission processing, a plurality of antennas may be used for transmission or only an antenna whose range corresponds to a position of transmission destination (judged based on the stored information in the storage unit 102) may be used for transmission.

After the transmission processing has been completed, an antenna whose receivable range is Dir. 4 capable of receiving a signal from the central control station 10 is used, and polling information is received at a timing t9. Reception processing and transmission processing will be performed in a manner similar to the above. In this network system, a transmission timing such as a time from transmission of polling system from the central control station to a response being performed or a time for next polling information transmission in the case of no response is predetermined. In each communication station, control for setting an antenna switching timing is performed so as to perform reception at the above timing.

Thus, while each communication station in the network executes a directional antenna switching process, wireless communication with other communication stations is executed, thereby always enabling proper diversity reception using an optimal antenna. In particular, even if a transmission channel quality is poor, satisfactory information transmission can be performed.

As in this example, a polling signal is utilized as a trigger for information transmission start when the signal is directed to its own station. Also, the signal information is utilized as information for selecting an optimal reception antenna when the signal is directed to other station. In this manner, even if a station performing transmission as in this example is frequently switched, an optimal directional antenna can be selected.

In addition, a timing at which polling information is transmitted from the central control station and a response timing thereto can be grasped. In this duration, therefore antenna switching can be controlled so that an optimal antenna can be used for reception, and antenna switching control can always be performed at a proper timing.

In the case of this example, if a transmission failure occurs, an antenna capable of receiving a signal from the central control station is selected. Thus, a signal from the central control station is speedily and well received, enabling proper transmission process under the control of the central control station.

Figure 9:
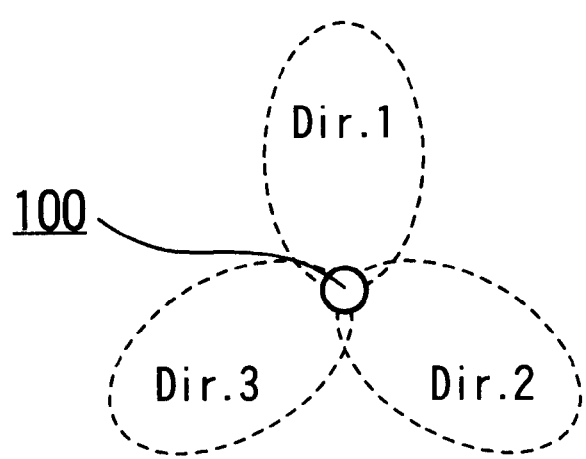
FIG. 9 is an explanatory view showing an example of antenna directivities (an example of three directions) according to another embodiment of the present invention.

In the above mentioned embodiment, although six directional antennas are provided as an example in a single communication station, a plurality of directional antennas different in number from the six directional antennas may be installed. For example, as shown in FIG. 9, as directivity ranges formed by antennas that the radio transmission apparatus 100 comprises, three direction antennas whose ranges are Dir. 1, Dir. 2, and Dir. 3 are allocated with intervals of 120 degrees may be constructed.

Figure 10:
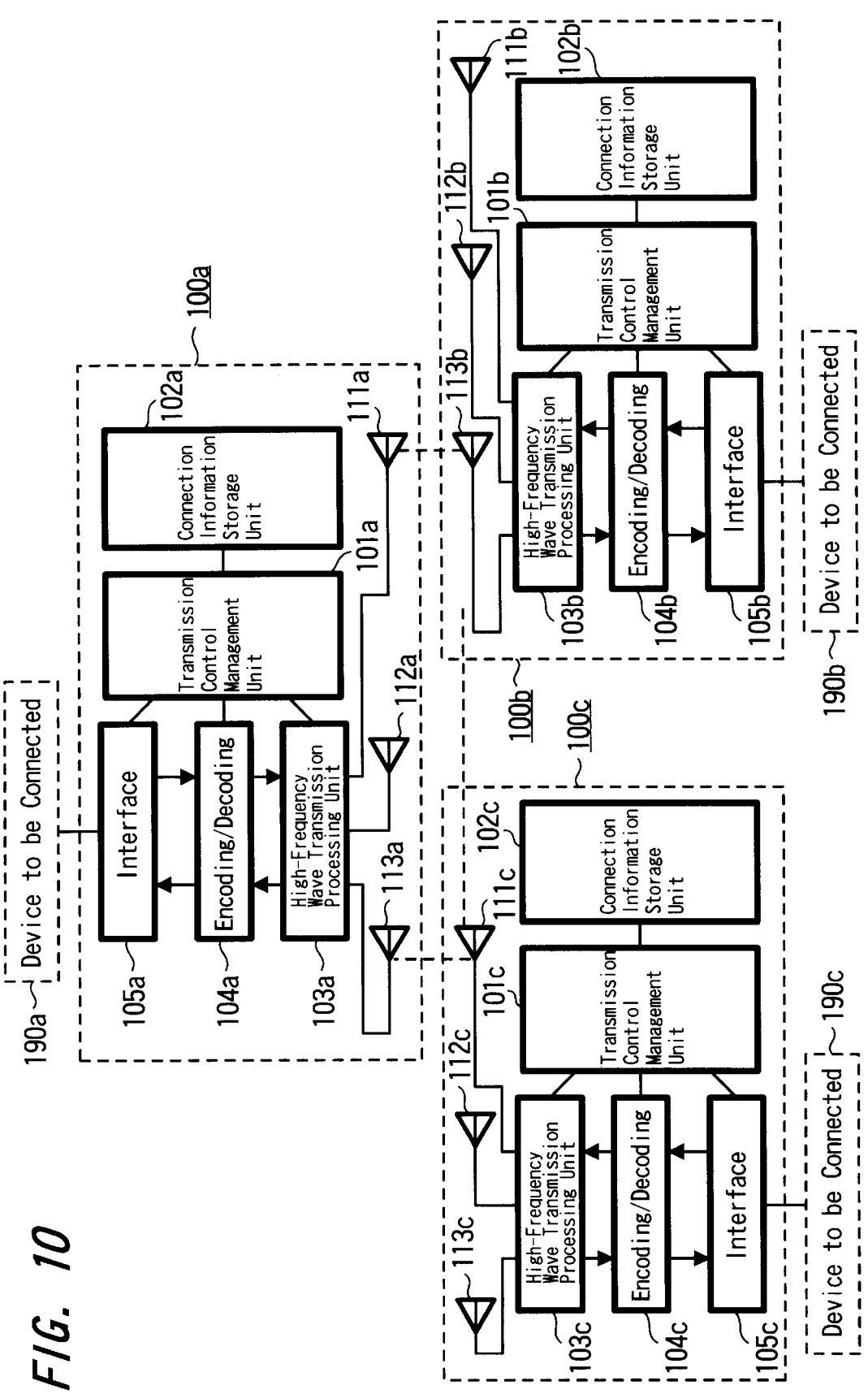
FIG. 10 is a block diagram showing a configuration example of wireless transmission apparatuses in which the antennas shown in the example of FIG. 9 are allocated.

In FIG. 10, there is shown an example when these three directional antennas are provided at each communication station, and information is transmitted by three communication stations (wireless transmission apparatuses 100a, 100b, and 100c) in a network system. Each of the wireless transmission apparatuses 100a, 100b, and 100c is structurally identical to the wireless transmission apparatus 100 shown in FIG. 3 according to the above embodiment except for the number of antennas. Like circuits other than antennas are designated by 'a', 'b', and 'c' assigned after reference numerals.

As directional antennas that the wireless transmission apparatuses 100a, 100b, and 100c each comprise, the wireless transmission apparatus 100a is provided with three antennas 111a, 112a, and 113a; the wireless transmission apparatus 100b is provided with three antennas 111b, 112b, and 113b; and the wireless transmission apparatus 100c is provided with three antennas 111c, 112c, and 113c. In these three antennas of each wireless transmission apparatus, for example, as shown in FIG. 9, the directivity ranges are set.

As optimal antennas selected by each transmission apparatus, for example, when wireless communication is performed among the wireless transmission apparatuses 100a and 100b, the antenna 111a of the transmission apparatus 100a and the antenna 113b of the transmission apparatus 100b are used. In addition, when wireless communication is performed among the wireless transmission apparatus 100a and the wireless transmission apparatus 100c, the antenna 113a of the transmission apparatus 100a and the antenna 111c of the transmission apparatus 100c are used. Further, when wireless communication is performed among the wireless transmission apparatus 100b and the wireless transmission apparatus 100c, the antenna 113b of the wireless transmission apparatus 100b and the antenna 100c of the wireless transmission apparatus 100c are used. In this case, these items of information are stored in the connection information storage units 102a, 102b, and 102c of the transmission apparatuses 100a, 100b, and 100c, respectively. Then, wireless transmission is performed while antennas are switched based on the respective items of information.

Figure 11:
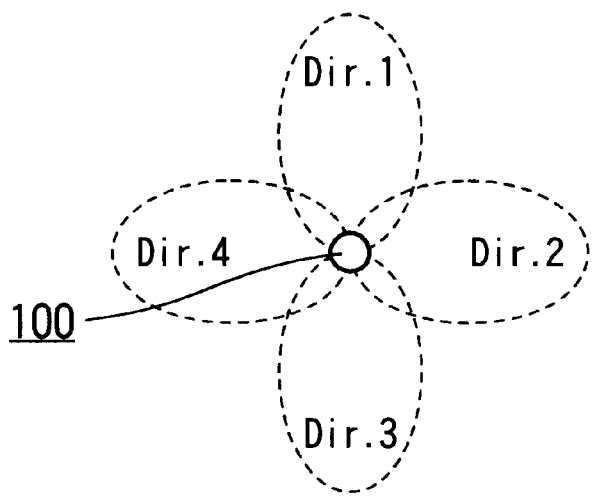
FIG. 11 is an explanatory view showing an example of antenna directivities (an example of four directions) according to another embodiment of the present invention.
Figure 12:
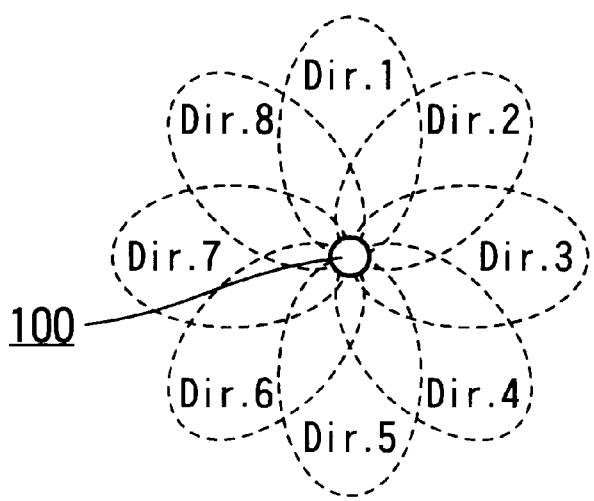
FIG. 12 is an explanatory view showing an example of antenna directivities (an example of eight directions) according to another embodiment of the present invention.

In addition, when the directional antennas that the wireless transmission apparatus 100 comprises is allocated, as shown in FIG. 11, the directivity ranges Dir. 1 to Dir. 4 of the four antennas may be changed by 90°. Further, as shown in FIG. 12, the directivity ranges DIR. 1 to Dir. 4 of the eight antennas that the wireless transmission apparatus 100 may be changed by 45°.

Furthermore, an allocation other than those of these examples may be possible. For example, in the above examples, although the directional antennas that each wireless transmission apparatus is installed are allocated at an equal angle, the angles may be different. For example, an allocation having directivity oriented in a direction where other communication stations exist in the network may suffice. In addition, as antennas that each wireless transmission apparatus comprises, nondirectional antennas may be provided together with the directional antennas so that these directional and nondirectional antennas are used selectively according to a reception state.

In addition, in the above mentioned embodiment, although it is applied to a network system in which wireless transmission is performed by means of polling control, the present invention is, of course, applicable to antenna selection processing in communication processing when wireless transmission is performed by means of other transmission control.

According to the communication control method as claimed described above, communication processing is performed by switching to any optimal antenna of a plurality of directional antennas prepared in a link fashion to a change of a communication station performing communication. Then, data transmission is performed by appropriate wireless communication using a directional antenna properly selected in the network.

According to the communication control method as described above, with respect to the judgment of a communication station to which a radio signal is transmitted next time, polling information transmitted from a predetermined control station is received; it is judged to be a communication station in which transmission has been specified based on the polling information; and a proper antenna switching process is executed by utilizing polling data.

According to the communication control method as described above, a timing of transmitting polling information and a transmission start timing at a communication station according to the polling information are predetermined; and antennas used in synchronism with the above timing are switched, thereby making it possible to execute the antenna switching in synchronism with the data transmission timing.

According to the communication control method as described above, when a trouble occurs during its own wireless communication, wireless communication is performed by using the antenna capable of best receiving a signal transmitted from a predetermined control station. When a station in which the next transmission is performed cannot be judged, there occurs a possibility in which information required for antenna switching can be obtained based on control information from the control station, and there occurs the possibility that appropriate reception can be ensured.

According to the transmission apparatus as claimed- in described above, selection of a plurality of antennas having directivities is properly controlled based on the judgment of a communication station performing communication next time and the stored information in the storing means; an optimal directional antenna is always selected, and wireless communication is performed; and data transmission is performed through appropriate wireless communication while the directional antenna is properly switched in the network comprising this transmission apparatus.

According to the transmission apparatus as described above, control means judges a communication station performing wireless communication next time based on the polling information transmitted from a predetermined control station received by transmission processing; and thus, a transmission apparatus in which proper antenna switching is executed can be obtained by utilizing polling data.

According to the transmission apparatus as described above, the control means judges a timing of antenna switching based on a timing at which polling information is received by transmission processing means, so that the antenna swithching can be performed at an accurate timing.

According to the transmission apparatus described above, when the control means cannot judge a communication station to be transmitted next time, control for connecting an antenna suitable to receive a signal transmitted from a predetermined control station to transmission processing means is performed. In this manner, there occurs a possibility that information required for antenna switching can be obtained based on control information from the control station, and a standby for appropriate reception is caused.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A communication control method for use in a wireless communication network having a plurality of communication stations, wherein at least one communication station of the plurality has a plurality of antennas having directivity, the method comprising the steps of:

judging a communication station to which a radio signal is to be transmitted in a next subsequent communication using the communication station having the plurality of antennas, wherein said step of judging a communication station to which a radio signal is transmitted in a next subsequent communication is judged to be a communication station that includes receiving polling information transmitted from a predetermined control station, in which a next transmission is specified based on the polling information;

judging an optimal antenna for performing the communication with the communication station based on a state when a signal from the judged communication station was received in the past;

performing wireless communication using the judged antenna;

predetermining a timing of transmitting said polling information and a transmission start timing in a communication station according to the polling information; and switching antennas to be used in synchronism with the predetermined timing according to the polling information.

2. The communication control method as claimed in claim 1, wherein when a trouble occurs in wireless communication in its own station, including the further step of performing wireless communication by using an antenna capable of best receiving a signal to be transmitted from a predetermined control station.

3. A transmission apparatus for performing wireless communication with another communication station in a predetermined network, comprising:

transmission processing means for performing wireless communication with said another communication station;

a plurality of antennas having directivity and being selectively connected to said transmission processing means;

storing means for storing information of an optimal antenna of said plurality of antennas for each communication station in said predetermined network; and control means for judging a communication station performing wireless transmission in a next subsequent communication in the predetermined network, for judging an antenna suitable to receive a signal from the judged communication station based on stored information in said storing means, and for determining an antenna of said plurality of antennas to be connected to said transmission processing means as the judged antenna, wherein said control means judges a communication station performing wireless transmission in a next subsequent communication based on polling information transmitted from a predetermined control station and received by said transmission processing means, and wherein said control means judges a timing of switching an antenna based on a timing when the polling information is received by said transmission processing means.

4. The transmission apparatus as claimed in claim 3, wherein when said control means cannot judge a communication station to transmit in a next subsequent communication, the control means performs control so that an antenna of said plurality of antennas suitable to receive a signal to be transmitted from a predetermined control station is connected to said transmission processing means.

* * * * *